Reissued June 11, 1929. Re. 17,324

UNITED STATES PATENT OFFICE.

CARL MARX, OF CHICAGO, ILLINOIS, ASSIGNOR OF ONE-HALF TO RUDOLPH WEISS, OF NEW YORK, N. Y.

PREPARATION OF CONCENTRATED ONION JUICE.

No Drawing. Original No. 1,619,826, dated March 8, 1927, Serial No. 63,767, filed October 20, 1925. Application for reissue filed February 23, 1929. Serial No. 342,292.

This invention relates to a process for the production of concentrated juice of vegetables and fruits containing relatively volatile ingredients, the preservation of which in the final concentrated product is desirable because of their flavoring and aromatic properties.

One of the objects of the present invention is the preparation of concentrated onion juice which contains substantially all of the highly volatile aromatic constituents of the onion.

Another object of the invention is the preparation of onion juice which, while containing substantially all of the highly volatile and pungent aromatic ingredients of the onion, contains less water than the juice naturally present in raw onions; that is to say, contains more total solids than raw onion juice.

A further object of the invention is to remove the water from onion juice so as to increase the total solids in the same and to produce a relatively concentrated product, without substantial loss of the highly volatile and pungent ingredients of the onion.

Another object of the invention is to heat comminuted onions to the boiling point of water whereby the more volatile pungent ingredients of the same will be volatilized; to recover some of the aqueous distillate carrying said pungent ingredients; thereupon further to evaporate the onion pulp or juice to effect the removal of water therefrom, and finally to introduce the volatile pungent matter previously removed into the concentrated product resulting from said evaporation.

Further objects will become apparent from the description hereinbelow.

In the preparation of concentrated fruit juices, such as those of the grape, loganberry, raspberry and the like, the usual procedure is to express the juice from the said fruits either before or after cooking and heating the fruit so as to render the same softer and the soluble constituents thereof easier of extraction. In expressing the juice any suitable means, such as a fruit press or the like may be employed. In concentrating the resultant partially clarified fruit juice, the same is heated to the boiling point and the evaporation of the excess water is effected without any particular precaution being exercised to guard against the loss of volatile ingredients, as these are present in such fruit juices as above mentioned only in a small and negligible degree.

When preparing concentrated juices of certain vegetables, however, such as the juice of the onion, of celery, celery root and other aromatic and odoriferous vegetables or vegetable products, the above outlined procedure would not result in a suitable and merchantable concentrated product, as in the course of heating the said juice the volatile and flavor-imparting constituents would become volatilized and lost. At the same time, due to the high water content of the said vegetables, such as onion, celery, celery root, etc., it becomes necessary, in order to conserve space and weight in the finished product, to eliminate at least a part of the water which is present in the said vegetables, by evaporation or otherwise.

I have discovered that concentrated onion juice or concentrate can be prepared successfully and economically by the following process, although I do not wish to limit myself to the exact procedure outlined, but desire it to be definitely understood that the sequence of the operation may be altered without departing in any way from the spirit of this my invention.

The preparation of concentrated onion juice, in accordance with the present invention, can be carried out successfully in the following manner, to wit:

The onions, which may be either red or white, or other variety, are first carefully cleaned by washing and are then peeled of their outer, dry skins by known means, such as rapidly tumbling the same in a peeling machine which consists of a rapidly rotating disc of emery or equivalent abrasive material while under a rapid current of water to carry away the removed peelings.

The onions are then ground up to a relatively fine pulp, by either passing through a machine analogous to a meat chopper, or any other device capable of finely dividing the onions. This operation is, preferably, carried out in a closed apparatus to avoid the loss of the volatile and pungent constituents of the onion, while at the same time making this operation much less troublesome to the operator.

The onion pulp thus obtained, and which contains approximately ninety three per cent of water, is then transferred to a suitable evaporating vessel, which may be of any material such as glass-lined steel tanks, enamelled tanks, tin-lined tanks or aluminum tanks, or of any metal which will not introduce any harmful and deleterious metallic element into the said juice. While in this evaporating vessel the onion pulp is subjected to a process of heating or boiling, either at ordinary atmospheric pressure, or above or below the said pressure, but I prefer to carry out this operation at the ordinary pressure of the atmosphere at this stage of the process. At ordinary pressure the boiling point of the material is substantially that of water, namely, 100° C. The pulp having been brought to the boiling point, the vapors escaping from the evaporating vessel are condensed by suitable condensing means, such as for example a coil of tin-lined pipe surrounded by cold water. The condensate is saved. It consists of water and substantially all of the volatile aromatic and pungent constituents of the onion. Approximately one tenth by weight of the original onion pulp may thus be distilled off and the distillate collected and preseved in closed vessels and store for use later as will be shown below.

Following the first evaporating off of the one tenth as above described, and which one tenth will be found to contain most of the volatile and pungent constituents of the onion, the evaporation or boiling of the remainder of the pulp is continued, either at atmospheric pressure, or in a partial or complete vacuum, until the total bulk of the said pulp has been reduced to approximately one half of the original volume. Although I can operate at atmospheric pressure, I find it advisable in order to economize time, and also to avoid injuring the onion pulp by too prolonged heating at a higher temperature to carry out this phase of the process at reduced pressure. The distillate arising from this evaporation need not be retained as it contains only minimal amounts of valuable volatile materials.

When the evaporation has proceeded to the desired degree, say to one half of the original bulk, the contents of the evaporating vessel are mixed, preferably by means of mechanical stirrers which may be installed in such vessel, with a small percentage, say from two to three per cent, of an absorbing medium such as refined kieselguhr or infusorial earth. This is to allow of more rapid and even filtration of the pulp. After mixing in the said kieselguhr, the onion pulp is filtered by mechanical means, such as by suction filters, or by filter presses, or by any suitable means now known, the residue being strongly compressed so as to remove as much as possible of the liquid constituents. The remaining compressed pulp can, if desired, be washed with a small amount of water.

The resultant, more or less clear filtrate is then either used directly for the next step, or, if a more concentrated extract is desired, can be evaporated further either in the same evaporating vessel, or one like it, and the bulk reduced to any desired extent, as for example, to again one half of the volume, so that the final concentration will thus be four-fold as calculated on the original bulk of the onion pulp.

In either case, that is whether the juice has been further concentrated or not, the concentrated juice resulting from the preceding operation is then admixed with the distillate obtained during the first evaporating step. As already stated, this distillate has preferably been stored out of contact with the air. This addition of the portion of the distillate containing the volatile and pungent ingredients will result in the re-introduction into the concentrated onion juice of the said ingredients which would have ordinarily been lost when boiling the onion juice had the precaution of collecting the first portion of the distillate not been taken. This is the essential feature of this invention.

The combined volatile distillate and concentrated juice will then be in the form of a more or less cloudy liquid as the admixture of the juice with the distillate gives rise to certain reactions the nature of which is not yet clearly defined theoretically. In any event, the combined volatile distillate and concentrated juice is then admixed with a small pecentage of kieselguhr as already mentioned before and is again filtered or otherwise clarified. As an alternative to filtration I may substitute, with equal effect, a centrifugal clarification such as is commonly carried out in rapidly revolving centrifugal machines known in the trade as super-centrifugals.

The final clear juice or onion concentrate thus obtained is then bottled in suitable containers. As a further precaution the bottled juice can be pasteurized or sterilized in the bottle; or, alternatively, a small percentage not over one tenth of one per cent, of an approved preservative, as, for example, sodium benzoate, may be added to prevent fermentation or deterioration of the juice with time.

I wish to distinctly point out that the filtration of the onion pulp may with equally good results be effected before the first evaporation, and the onion pulp may be filtered or pressed in the raw state, although in this case the pressure employed for the filtration must be greater and the operation must be carried out in closed containers to prevent undue loss of the volatile constituents. If this alternative is adopted, the boiling will be somewhat easier, but the juice on boiling will precipitate a certain amount of albuminoid matter which renders the subsequent filtration not quite as easy as if the boiling be carried out in the presence of all of the insoluble solids of the onion as first described above.

In any case the first portion, about one tenth, of the distillate resulting from the heating of the onion pulp or onion juice is saved and afterwards re-incorporated with the concentrated liquid or juice as aforesaid.

What I claim and desire to secure by Letters Patent is:

1. Method of preparing concentrated onion juice, consisting in boiling comminuted onions in a closed container, collecting only the first one-tenth of the distillate produced, continuing the boiling until the total bulk of comminuted onions has been reduced to at least one half of the original bulk, filtering the mass of softened onion pulp thus formed, and re-incorporating with the resultant filtrate the first one-tenth of the distillate obtained during the early part of the boiling operation, substantially as described.

2. The process of preparing concentrated onion juice which comprises subjecting crushed onions to sufficient heat to cause the juice therein contained to boil whereby steam containing the volatile flavoring constituents of the onions will be produced, condensing the first portion of said steam whereby a distillate containing substantially all of the volatile flavoring ingredients will be obtained, thereupon further heating said crushed onions to remove water therefrom by evaporation until their bulk has been materially reduced, filtering said boiled crushed onions to remove insoluble materials therefrom and thereupon incorporating with said filtrate the distillate hereinabove mentioned.

3. The process of producing concentrated onion juice which comprises evaporating crushed onions in a closed container, condensing the vapors produced by said evaporation as long as the vapors contain appreciable quantities of the volatile flavoring constituents of the onions, thereupon evaporating the onions to a substantial extent, pressing the onions to remove the liquid portions thereof, and adding to said expressed liquid the condensed vapors hereinabove mentioned.

4. The process of preparing concentrated onion juice which comprises crushing raw onions to produce a pulp, boiling said pulp in a container provided with condensing means to produce steam entraining the volatile flavoring ingredients of the onions, condensing substantially the first one-tenth of said steam, continuing the boiling of the pulp to concentrate the same to a substantial extent whilst discarding the aqueous condensate formed, filtering the pulp, and mixing the filtrate thus obtained with the condensed steam containing the volatile flavoring ingredients of the onions.

5. Concentrated onion juice containing at least 14% of the water-soluble constituents of natural onions, a substantial amount of the volatile flavoring constituents of onions, and characterized by freedom from substances insoluble in water.

In testimony whereof, I have hereunto subscribed my name this 20th day of February, 1929.

CARL MARX.